(12) United States Patent
Struck

(10) Patent No.: US 7,975,505 B2
(45) Date of Patent: Jul. 12, 2011

(54) ARRANGEMENT HAVING A TURBOMACHINE, A COOLER AND A CARRYING FRAME

(75) Inventor: Henning Struck, Wesseling (DE)

(73) Assignee: Atlas Copco Energas GmbH, Cologne (DE)

( * ) Notice: Subject to any disclaimer, the term of this patent is extended or adjusted under 35 U.S.C. 154(b) by 822 days.

(21) Appl. No.: 11/977,564

(22) Filed: Oct. 25, 2007

(65) Prior Publication Data

US 2008/0112825 A1 May 15, 2008

(30) Foreign Application Priority Data

Nov. 10, 2006 (DE) .......................... 10 2006 052 990

(51) Int. Cl.
*F25D 9/00* (2006.01)
(52) U.S. Cl. .................................... 62/401; 417/423.14
(58) Field of Classification Search .................. 248/901; 165/67, 68, 81, 82; 415/901, 116; 62/401; 417/423.14, 423.8, 410.1
See application file for complete search history.

(56) References Cited

U.S. PATENT DOCUMENTS

| 4,458,866 A | | 7/1984 | Graves |
| 5,243,815 A | | 9/1993 | Maier et al. |
| 5,282,602 A | * | 2/1994 | Zimmermann ............... 248/680 |
| 5,522,454 A | * | 6/1996 | Gros et al. ..................... 165/82 |
| 6,257,834 B1 | * | 7/2001 | Bremer et al. .................. 417/53 |

* cited by examiner

*Primary Examiner* — Mohammad Ali
(74) *Attorney, Agent, or Firm* — Collard & Roe, P.C.

(57) ABSTRACT

An arrangement has a turbomachine, a cooler, and a carrying frame that accommodates the turbomachine and the cooler, with frame segments. The cooler has at least one essentially pipe-shaped cooling element disposed horizontally, and the frame segments are disposed at a distance from one another in the longitudinal direction of the cooling element, and have contact points on the underside to support the arrangement on a floor surface or a base frame. The at least one cooling element is attached to the frame segments by way of flexible sections for accommodating thermal deformations of the cooling element.

14 Claims, 2 Drawing Sheets

ARRANGEMENT HAVING A TURBOMACHINE, A COOLER AND A CARRYING FRAME

CROSS REFERENCE TO RELATED APPLICATIONS

Applicant claims priority under 35 U.S.C. §119 of German Application No. 10 2006 052 990.1 filed Nov. 10, 2006.

BACKGROUND OF THE INVENTION

1. Field of the Invention

The invention relates to an arrangement having a turbomachine, a cooler, and a carrying frame that accommodates the turbomachine and the cooler. The carrying frame has frame segments, and the cooler has at least one essentially pipe-shaped cooling element disposed horizontally. The frame segments are disposed at a distance from one another in the longitudinal direction of the cooling element, and have contact points on the underside to support the arrangement on a floor surface or a base frame. The turbomachine can be used, for example, as a compressor, an expander, or as a combined expander/compressor arrangement (compander), for various gas processes. Because of the change in status of the working medium of the turbomachine, extreme temperature differences are produced, which can lead to different expansions of the parts of the arrangement. In the coolers, in particular, great temperature differences occur, which can lead to great thermal deformations.

2. The Prior Art

Arrangements having the characteristics described initially are known from practice, and a very compact method of construction, resistant to torsion, can be achieved by arranging the turbomachine and the cooler on a common carrying frame. The turbomachine and an optionally provided electrical machine are typically disposed above the cooler, on the frame segments. In order to avoid material stresses and maladjustment of the turbomachine and the optionally provided electrical machine due to the thermal expansion of the cooler, the known arrangements are only attached to a base frame or a floor surface, for example a foundation or a ship deck, with the contact points of only one frame segment, while the other contact points can slide on the floor surface or the base frame, respectively, as the result of a thermal deformation of the at least one cooling element. It is a disadvantage that forces due to ship movements can only be absorbed in a limited range, and this can lead to deformations of the frame. For this reason, the frame must be fixed in place with the base at several contact points, and again, thermal deformation of the frame is hindered. This can lead to great reaction forces at the fixation points with the base, and to material fatigue in the frame or at the coolers.

U.S. Pat. No. 5,243,815 describes an arrangement with a gas turbine drive mechanism and a heat exchanger. The two pipes of the heat exchanger are mounted, at their ends, in such a manner that thermally or mechanically caused stresses in the components of the arrangement can be balanced out by a bearing play that permits a relative movement of the pipes about the bearing points, as well as by movably disposed bearings for the pipes. A carrying frame for a heat exchanger is described in U.S. Pat. No. 4,458,866, in which the pipes of the heat exchanger are mounted in the carrying frame in thermally isolated manner, by way of flanges. In addition, thermally caused expansion of the pipes in the axial and/or radial direction as well as limited sideways movement of the pipes are also possible.

SUMMARY OF THE INVENTION

With this background, it is therefore an object of the invention to provide an arrangement having the characteristics described initially, which can be securely fixed in place on a floor surface and, at the same time, allows expansions of the cooler, without any material overload or excessive maladjustment of the turbomachine taking place in this connection.

This task is accomplished, according to the invention, in that the at least one cooling element is attached to the frame segments by way of flexible sections for accommodating thermal deformations of the cooling element. According to the invention, the thermal expansions of the cooler are absorbed in the frame not by the sliding of several bearing points, as in the case of the arrangements known from the state of the art, but rather by resilience introduced in a targeted manner. This resilience is achieved by the design structure of the frame. Thus, the flexible sections can also have deformable connection tabs on which the at least one cooling element is held. In this connection, the flexible sections with the deformable connection tabs can be deformed, together with the contact points and the base frame, to such an extent that the thermal deformation of the at least one cooling element can be absorbed.

The contact points of two or more frame segments disposed at a distance from one another can be connected with the floor surface or the base frame in a fixed manner, for example by screw connections and/or welded connections. To increase the friction value between the contact points and the floor surfaces or the base frame, the contact points and the related standing surfaces are roughened or profiled. Preferably, all of the contact points with which the arrangement is supported on the floor surface or the base frame, respectively, by way of the carrying frame, are attached to the floor surface or the base frame, respectively, by screw connections, bolt connections, shape-fit fitted connections, or welds, for example.

For stepwise cooling, or for cooling of different process stages, there can be two pipe-shaped cooling elements of the cooler that lie next to one another. The essentially pipe-shaped cooling elements preferably have a round cross-section. However, other cross-sections are also possible, which do not necessarily have to be constant over the length of the coolers. The cooling elements can also have narrowings, collars, pipe connectors, and flanges, without restriction.

The turbomachine can be structured as a compressor, an expander, or a compander having at least one compression stage and/or one expansion stage. The turbomachine is preferably structured as a radial machine. Typically, the turbomachine is connected, directly or by way of a gear mechanism, with an electrical machine structured as a generator or electric motor, which serves as the power take-off or drive, respectively, for the turbomachine. In a preferred embodiment of the invention, the turbomachine is disposed on a first frame segment, and the electrical machine is disposed on a second and a third frame segment. The turbomachine and the electrical machine are connected with one another by a coupling. Since thermal deformations of the at least one cooling element are absorbed by flexible sections of the frame segments, a precise alignment of turbomachine and electrical machine is guaranteed at all times.

In order to allow simple attachment of the arrangement to a floor surface or a base frame, at least one attachment device, for example in the form of a screw tab or weld tab for fixation of the frame segments, is preferably provided at all the contact points. By fixing the arrangement on several and preferably all of the contact points, the carrying frame is able to withstand clearly greater lateral forces, which can occur during an earthquake in the case of a stationary structure on land, or during ship movements in the case of mobile use on a gas tanker, for example.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
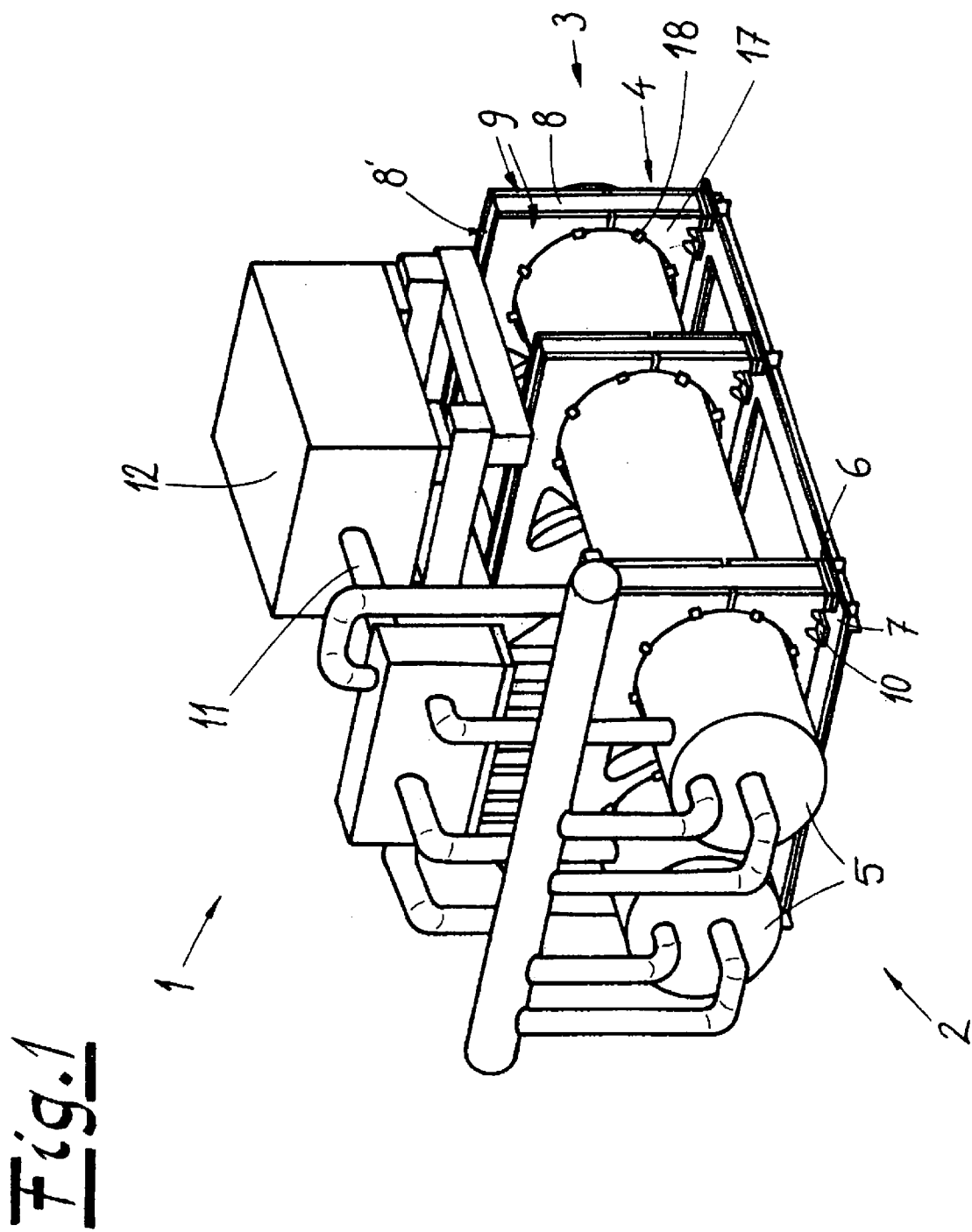
FIG. 1 shows an arrangement with a turbomachine, a cooler, and a carrying frame that accommodates the turbomachine and the cooler according to one embodiment of the invention.

Referring now in detail to the drawings, FIG. 1 shows an arrangement according to the invention, with a turbomachine 1, a cooler 2, and a carrying frame 3 that accommodates turbomachine 1 and cooler 2, with frame segments 4. Cooler 2 is formed from two pipe-shaped cooling elements 5 that lie next to one another, which are structured as heat exchangers and through which a coolant flows in operation. Carrying frame 3 has three frame segments 4, which are disposed at a distance from one another in the longitudinal direction of horizontally disposed cooling elements 5, and have contact points 6 for supporting the arrangement on a base frame 7 or a floor surface on the underside. Frame segments 4 have shape-stable vertical metal profiles 8, which are connected by a horizontal metal profile 8' at their upper end. Flexible sections 9 formed from bendable metal sheets 17 and deformable connection tabs 18 are disposed on the front and back sides of frame segments 4. Cooling elements 5 are attached to flexible sections 9, which can absorb thermal deformations of cooling elements 5 during operation of the arrangement. Tabs 10 are disposed at contact points 6 of frame segment 4 that lies in the front in the front view of the figure, which tabs are screwed to base frame 7, welded to it, or rigidly connected with it in some other way. To increase the friction value between contact points 6 and floor surface or base frame 7, respectively, the contact surfaces can be roughened. Carrying frame 3 can be connected with base frame 7 at all of the contact points, in fixed manner. However, base frame 7 is not compulsory. Frame segments 4 can also be set onto a floor surface directly, i.e. without a base frame 7.

Turbomachine 1 is disposed on a first frame segment 4 and connected with an electrical machine 12 by way of a coupling 11 that is disposed on a second and a third frame segment 4. Depending on the configuration of turbomachine 1, which is preferably structured as a radial compressor, a radial expander, or a combined radial compander, electrical machine 12 can be structured as a generator or an electric motor.

Figure 2:
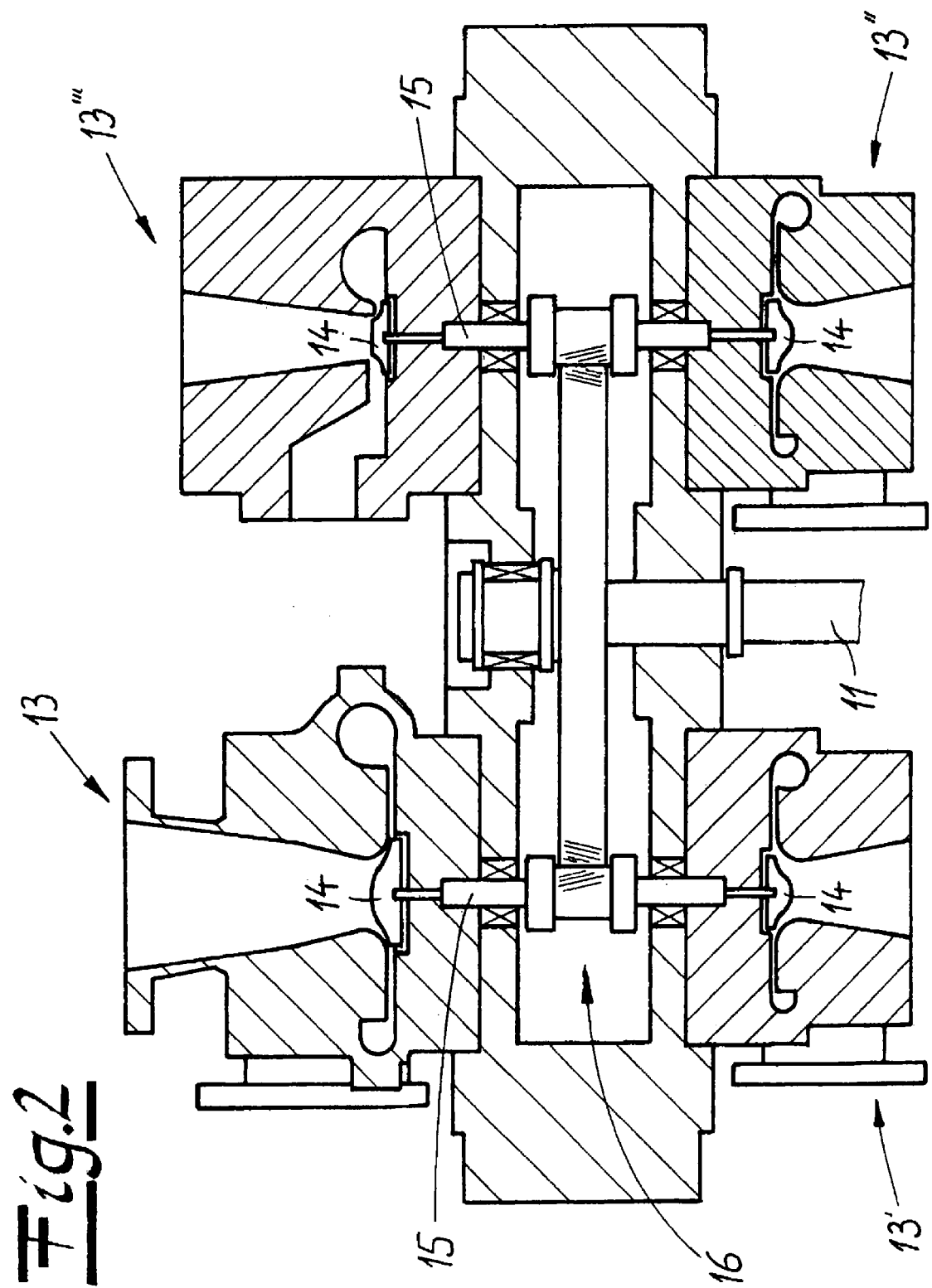
FIG. 2 shows a sectional view of the turbomachine shown in FIG. 1.

FIG. 2 shows a possible embodiment of turbomachine 1 according to FIG. 1 as a compander for cooling a working gas, merely as an example. The compander has four stages 13, 13', 13'', 13''' each having an impeller 14 connected with electrical machine 12, structured as an electric motor, by way of rotor shafts 15, a gear mechanism 16, and a coupling 11. The working gas is greatly compressed in a first, a second, and a third stage 13, 13', 13'', and the greatly warmed working gas is cooled in the pipe-shaped cooling elements 5 of cooler 2, between the compression stages. After compression in third stage 13'' and subsequent cooling, the greatly compressed but comparatively cold working gas is passed to fourth stage 13''', which is structured as an expander. Cooling to cryogenic temperatures then takes place in connection with the expansion of the working gas.

Accordingly, while only a few embodiments of the present invention have been shown and described, it is obvious that many changes and modifications may be made thereunto without departing from the spirit and scope of the invention.

What is claimed is:

1. An arrangement comprising:
a turbomachine;
a cooler having at least one pipe-shaped horizontally disposed cooling element; and
a carrying frame that accommodates the cooler, and the turbomachine disposed above the cooler, said carrying frame having at least three frame segments disposed at a distance from one another in a longitudinal direction of the cooling element, all of said frame segments having contact points on an underside to support the arrangement on a floor surface or a base frame,
wherein the at least one cooling element is attached to all of the frame segments by way of flexible sections for accommodating thermal deformations of the cooling element.

2. An arrangement according to claim 1, wherein the cooler has two pipe-shaped cooling elements that lie next to one another.

3. An arrangement according to claim 1, wherein the at least one cooling element is structured as a heat exchanger through which a coolant can flow.

4. An arrangement according to claim 1, wherein there is at least one attachment device for fixing the frame segments on the floor surface or a base frame, said attachment device being disposed on at least three of said contact points.

5. An arrangement according to claim 4, wherein the frame segments are attached to the floor surface or the base frame by screw connections or weld connections, in a region of the contact points.

6. An arrangement according to claim 1, wherein the contact points are roughened in order to achieve an increased friction value in interaction with related roughened sections of the floor surface or the base frame.

7. An arrangement according to claim 1, wherein the carrying frame accommodates an electrical machine structured as a generator or electric motor, said electrical machine being mechanically coupled with the turbomachine.

8. An arrangement according to claim 7, wherein the turbomachine has an impeller housing and at least one impeller, and is disposed on a first frame segment, and the electrical machine is disposed on a second and a third frame segment.

9. An arrangement according to claim 1, wherein the turbomachine is structured as a radial compressor, a radial expander, or combined radial compander, the combined radial compander having at least one compression stage and one expansion stage.

10. An arrangement according to claim 1, wherein the at least one cooling element is held on deformable connection tabs of the flexible sections.

11. An arrangement according to claim 2, wherein there is at least one attachment device for fixing the frame segments on the floor surface or a base frame, said attachment device being disposed on at least three of said contact points.

12. An arrangement according to claim 2, wherein the at least one cooling element is held on deformable connection tabs of the flexible sections.

13. The arrangement according to claim 1, wherein each frame segment has shape-stable vertical metal profiles, which are connected by a horizontal metal profile at their upper end.

14. The arrangement according to claim 1, wherein the flexible sections are disposed on the front and the back sides of the frame segments and are formed from bendable metal sheets and deformable connection tabs.

* * * * *